United States Patent
Monberg et al.

(10) Patent No.: US 12,457,183 B2
(45) Date of Patent: *Oct. 28, 2025

(54) DYNAMIC CONTENT DELIVERY VIA EMAIL

(71) Applicant: Zeta Global Corp., New York, NY (US)

(72) Inventors: Christian Monberg, San Francisco, CA (US); Barney Govan, Walnut Creek, CA (US); Tim Hudson, Brooklyn, NY (US)

(73) Assignee: Zeta Global Corp., New York, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/410,695

(22) Filed: Jan. 11, 2024

(65) Prior Publication Data

US 2024/0146677 A1 May 2, 2024

Related U.S. Application Data

(63) Continuation of application No. 16/460,492, filed on Jul. 2, 2019, now Pat. No. 11,909,701.

(Continued)

(51) Int. Cl.
*H04L 51/18* (2022.01)
*H04L 51/063* (2022.01)
*H04L 67/568* (2022.01)

(52) U.S. Cl.
CPC ............ *H04L 51/18* (2013.01); *H04L 51/063* (2013.01); *H04L 67/568* (2022.05)

(58) Field of Classification Search
CPC ... H04L 51/18; H04L 67/2842; H04L 67/568; H04L 51/063
See application file for complete search history.

(56) References Cited

U.S. PATENT DOCUMENTS 5,991,798 A 11/1999 Ozaki et al.
6,463,461 B1 * 10/2002 Hanson ................ G06Q 10/107
709/204

(Continued)

OTHER PUBLICATIONS

"U.S. Appl. No. 16/460,492, Advisory Action mailed Apr. 24, 2023", 3 pgs.

(Continued)

*Primary Examiner* — Madhu Woolcock
(74) *Attorney, Agent, or Firm* — Schwegman Lundberg & Woessner, P.A.

(57) ABSTRACT

Dynamic content can be delivered via email. Email messages include HTML content with one or more hyperlinks referring to a network-connected dynamic content server. The hyperlinks are accessed upon rendering of the email on a client device, triggering a request to a dynamic content server. The dynamic content server determines a content item to be served in response to the request. The dynamic content item determination may be based on factors including the identity of the requester, the email communication in which the hyperlink is embedded, recent activities or behavior on the part of the requester, and/or known preference or demographic information associated with the requester. The request can be directed to a selected content item stored within a content delivery network, for transmission back to the requester and display to the user within the email.

20 Claims, 13 Drawing Sheets

Related U.S. Application Data

(60) Provisional application No. 62/749,411, filed on Oct. 23, 2018.

(56) References Cited

U.S. PATENT DOCUMENTS

| | | | |
|---|---|---|---|
| 6,507,865 B1 | 1/2003 | Hanson et al. | |
| 6,523,063 B1 | 2/2003 | Miller et al. | |
| 6,965,926 B1 | 11/2005 | Shapiro et al. | |
| 9,509,764 B1 | 11/2016 | Kolam | |
| 10,310,699 B1 | 6/2019 | Jain et al. | |
| 10,650,073 B1 | 5/2020 | Manzi et al. | |
| 11,909,701 B2 | 2/2024 | Monberg et al. | |
| 2001/0010059 A1* | 7/2001 | Burman | G06F 11/3419 709/224 |
| 2001/0025300 A1* | 9/2001 | Miller | H04L 51/18 709/206 |
| 2002/0087631 A1 | 7/2002 | Sharma | |
| 2004/0204983 A1 | 10/2004 | Shen et al. | |
| 2004/0215479 A1* | 10/2004 | Dorsey | H04L 51/063 705/14.66 |
| 2004/0249709 A1 | 12/2004 | Donovan et al. | |
| 2005/0038861 A1 | 2/2005 | Lynn et al. | |
| 2005/0044003 A1 | 2/2005 | Okeeffe et al. | |
| 2005/0165644 A1 | 7/2005 | Beyda et al. | |
| 2005/0198175 A1 | 9/2005 | Thomas et al. | |
| 2006/0122883 A1 | 6/2006 | Lynn | |
| 2006/0253537 A1 | 11/2006 | Thomas et al. | |
| 2007/0083602 A1 | 4/2007 | Heggenhougen et al. | |
| 2007/0116284 A1* | 5/2007 | Esclamada | G06Q 10/107 380/255 |
| 2007/0244977 A1* | 10/2007 | Atkins | H04L 51/063 709/206 |
| 2007/0282893 A1 | 12/2007 | Smith et al. | |
| 2008/0163071 A1 | 7/2008 | Abbott et al. | |
| 2009/0018896 A1 | 1/2009 | Mcgreal | |
| 2010/0318407 A1 | 12/2010 | Leff et al. | |
| 2011/0035284 A1 | 2/2011 | Moshfeghi | |
| 2011/0066692 A1* | 3/2011 | Ciancio-Bunch | H04L 51/234 709/206 |
| 2011/0184793 A1* | 7/2011 | Bohannon | G06Q 30/0226 709/236 |
| 2011/0213655 A1 | 9/2011 | Henkin et al. | |
| 2011/0252103 A1 | 10/2011 | Beyer et al. | |
| 2011/0314116 A1 | 12/2011 | Bayer et al. | |
| 2012/0011196 A1 | 1/2012 | Green et al. | |
| 2012/0042025 A1* | 2/2012 | Jamison | G06Q 30/0242 709/206 |
| 2012/0109741 A1 | 5/2012 | Ballapragada et al. | |
| 2012/0239489 A1 | 9/2012 | Peretti et al. | |
| 2013/0110950 A1 | 5/2013 | Martine et al. | |
| 2014/0108572 A1* | 4/2014 | Borzilleri | H04L 51/234 709/206 |
| 2014/0222553 A1 | 8/2014 | Bowman | |
| 2014/0244734 A1 | 8/2014 | Nutt et al. | |
| 2014/0279070 A1 | 9/2014 | Ramakrishnan et al. | |
| 2014/0379495 A1 | 12/2014 | Fielder et al. | |
| 2015/0019910 A1 | 1/2015 | Simon et al. | |
| 2015/0100645 A1 | 4/2015 | Steinmann et al. | |
| 2015/0370451 A1 | 12/2015 | Maltese et al. | |
| 2017/0185912 A1 | 6/2017 | Friggeri et al. | |
| 2018/0255159 A1 | 9/2018 | Cohen et al. | |
| 2018/0336587 A1 | 11/2018 | Lackman et al. | |
| 2019/0019236 A1 | 1/2019 | Kim et al. | |
| 2019/0205901 A1 | 7/2019 | Zhang | |
| 2020/0127957 A1 | 4/2020 | Monberg et al. | |

OTHER PUBLICATIONS

"U.S. Appl. No. 16/460,492, Advisory Action mailed Jul. 26, 2022", 3 pgs.

"U.S. Appl. No. 16/460,492, Examiner Interview Summary mailed Jun. 30, 2022", 2 pgs.

"U.S. Appl. No. 16/460,492, Examiner Interview Summary mailed Oct. 29, 2021", 2 pgs.

"U.S. Appl. No. 16/460,492, Examiner Interview Summary mailed Dec. 5, 2022", 3 pgs.

"U.S. Appl. No. 16/460,492, Final Office Action mailed Jan. 4, 2023", 33 pgs.

"U.S. Appl. No. 16/460,492, Final Office Action mailed May 3, 2022", 36 pgs.

"U.S. Appl. No. 16/460,492, Final Office Action mailed Aug. 25, 2021", 31 pgs.

"U.S. Appl. No. 16/460,492, Non Final Office Action mailed Mar. 15, 2021", 26 pgs.

"U.S. Appl. No. 16/460,492, Non Final Office Action mailed Jun. 16, 2023", 37 pgs.

"U.S. Appl. No. 16/460,492, Non Final Office Action mailed Sep. 8, 2022", 32 pgs.

"U.S. Appl. No. 16/460,492, Non Final Office Action mailed Dec. 22, 2021", 34 pgs.

"U.S. Appl. No. 16/460,492, Notice of Allowance mailed Oct. 11, 2023", 20 pgs.

"U.S. Appl. No. 16/460,492, Response filed Feb. 22, 2022 to Non Final Office Action mailed Dec. 22, 2021", 9 pgs.

"U.S. Appl. No. 16/460,492, Response filed Apr. 4, 2023 to Final Office Action mailed Jan. 4, 2023", 10 pgs.

"U.S. Appl. No. 16/460,492, Response filed May 1, 2023 to Advisory Action mailed Apr. 24, 2023", 11 pgs.

"U.S. Appl. No. 16/460,492, Response filed Jun. 29, 2022 to Final Office Action mailed May 3, 2022", 11 pgs.

"U.S. Appl. No. 16/460,492, Response filed Aug. 3, 2022 to Advisory Action mailed Jul. 26, 2022", 12 pgs.

"U.S. Appl. No. 16/460,492, Response filed Sep. 15, 2023 to Non Final Office Action mailed Jun. 16, 2023", 11 pgs.

"U.S. Appl. No. 16/460,492, Response filed Oct. 26, 2021 to Final Office Action mailed Aug. 25, 2021", 12 pgs.

"U.S. Appl. No. 16/460,492, Response filed Dec. 8, 2022 to Non Final Office Action mailed Sep. 8, 2022", 11 pgs.

* cited by examiner

DYNAMIC CONTENT DELIVERY VIA EMAIL

CLAIM OF PRIORITY

This patent application is a continuation of U.S. patent application Ser. No. 16/460,492, entitled "Dynamic Content Delivery Via Email", filed on Jul. 2, 2019, which application claims the benefit of priority, under 35 U.S.C. Section 119(e), to Monberg et al, U.S. Provisional Patent Application Ser. No. 62/749,411, entitled "Dynamic Content Delivery Via Email", filed on Oct. 23, 2018, which are hereby incorporated by reference herein in their entireties.

TECHNICAL FIELD

The present disclosure relates in general to data processing systems, and in particular to systems and methods for dynamic delivery of content via email.

BACKGROUND

Email is one of the most prevalent forms of communication amongst individuals via the Internet. Traditionally, email messages are created by an originating user, and transmitted via the originating user's internet-connected email server, to a receiving user's Internet-connected email server. In some circumstances, the recipient's email server may then, periodically, deliver copies of the message to an email client application, which may be operating on or via one or more of the recipient's personal electronic devices. The recipient can then use one or more electronic devices implementing email clients to view the received messages. In some circumstances, a web mail client associated with the recipient's email server may be accessible via the Internet to render email messages stored on the server.

With the proliferation of internet-connected devices, email messages increasingly contain URLs referencing static content items accessible via the internet. When an email client renders such a message, preferably the content referenced by URLs is downloaded and displayed. Because URLs are nearly always much smaller in size than the resources they are referencing, incorporating URLs in this way facilitates broad dissemination of graphical content via email, while minimizing outgoing server bandwidth requirements and recipient email storage requirements.

In some cases, Internet-based services may use information about the recipient to customize the content or appearance of email messages. For example, a retailer sending an advertising email to a target customer list that includes individual names and email addresses, may incorporate each recipient's name into the subject line of each email to personalize the message and attract the recipient's attention. As another example, an apparel retailer having customer home address information conducting an advertising campaign in January may advertise snow gear to customers having a home address in Minnesota, while advertising light jackets to customers having a home address in Arizona.

However, the content of such personalized messages is typically fixed at or before the time the email message is transmitted by the originator. Therefore, if the Minnesota resident is spending the winter in Arizona, they will still view snow gear advertisements when opening the email message. Also, if there is a delay, and the recipient opens the email message in March or April, they will still view snow gear advertisements, even though it may be no longer relevant to the recipient.

SUMMARY

The present disclosure describes systems and methods for publishing dynamic content via email. The dynamic content may not be determined until after the time at which the email message is transmitted to the recipient. The content can be personalized based on the user's identity, mood, behavior, topics of interest, or other factors.

In some examples, such dynamic code can be added to an email using a hyperlink, such as <a href> and <img> tags containing an embedded user identifier. When the recipient's email client loads the email, the resource embodied in the hyperlink is requested. A request is transmitted to a dynamic content server, and potentially interpreted by a real-time personalization engine, before serving a selected image or other content item. The dynamically-selected images or content items are preferably stored on a Content Delivery Network for prompt service back to, and rendering by, the recipient's email client. The link for the selected content item may then be cached for the associated recipient.

Additional parameters can be included in the hyperlink, such as the <img> tag and bt_ts (i.e. request ID), to exclude resources, restrict to certain metadata fields, restrict to location, return consistent content across multiple renderings of the same email, and/or seed the personalized content based on a specific item. This provides email originators with significant control over dynamic content delivery.

In accordance with another aspect, tools and methods are provided to facilitate generation of emails having dynamic content. A drag-and-drop editor can be provided to generate an email template having dynamic content components. The dynamic content components can leverage a personalization platform to select content. Once the template has been created, corresponding HTML can be exported. The HTML can be transmitted via standard email service providers, thereby enabling email originators to deliver emails having dynamic content using their existing email service provider. Filters can be added inline to facilitate even greater control over delivered content by the template creator.

In accordance with yet another aspect, an exclude service may be provided in which rules are defined to help manage content that is delivered dynamically and in real-time. For example, an advertiser may feature one item to all recipients, with several additional items being selected dynamically based on past user behavior and/or other user information. A deduplication exclude service may exclude the common featured item from the possible set of other items that may be selected dynamically for presentation, thereby avoiding the possibility of advertising the same item twice in the same email.

In some examples, a system for publishing dynamic content via email comprises at least one processor for executing machine-readable instructions; and a memory storing instructions configured to cause the at least one processor to perform operations comprising, at least: transmitting an email message by an email server for delivery to a recipient device, the email message including a header and a body, wherein the body includes one or more content hyperlinks to dynamic content, the hyperlinks including at least an href tag and an img tag; receiving, via a network, a request for dynamic content at a dynamic content server based on a rendering of the email message on the recipient device wherein the href tag and img tag are interpreted causing the recipient device to transmit the request for dynamic content; and transmitting the dynamic content to the recipient device.

In some examples, the operations further comprise determining a particular content item with which the request for dynamic content is associated based on a message ID contained within the request for dynamic content.

In some examples, the operations further comprise relaying information from the request for dynamic content to a personalization server and receiving, from the personalization server, a content item ID; and, based on the content item ID, making a new content determination and transmitting different content to the recipient device in response to an email message on the recipient device being opened.

In some examples, the operations further comprise making the new content determination after a persistence period expires.

In some examples, the operations further comprise redirecting the request for dynamic content to a content item identified by the content item ID and transmitting the content item to the recipient device via a content delivery network.

In some examples, the operations further comprise caching the particular content item with which the request for dynamic content is associated and utilizing the cached content item to enable a determination of the persistence period.

Various other objects, features, aspects, and advantages of the present inventive subject matter and embodiments will become more apparent from the following detailed description of embodiments, along with the accompanying drawings in which like numerals represent like components.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
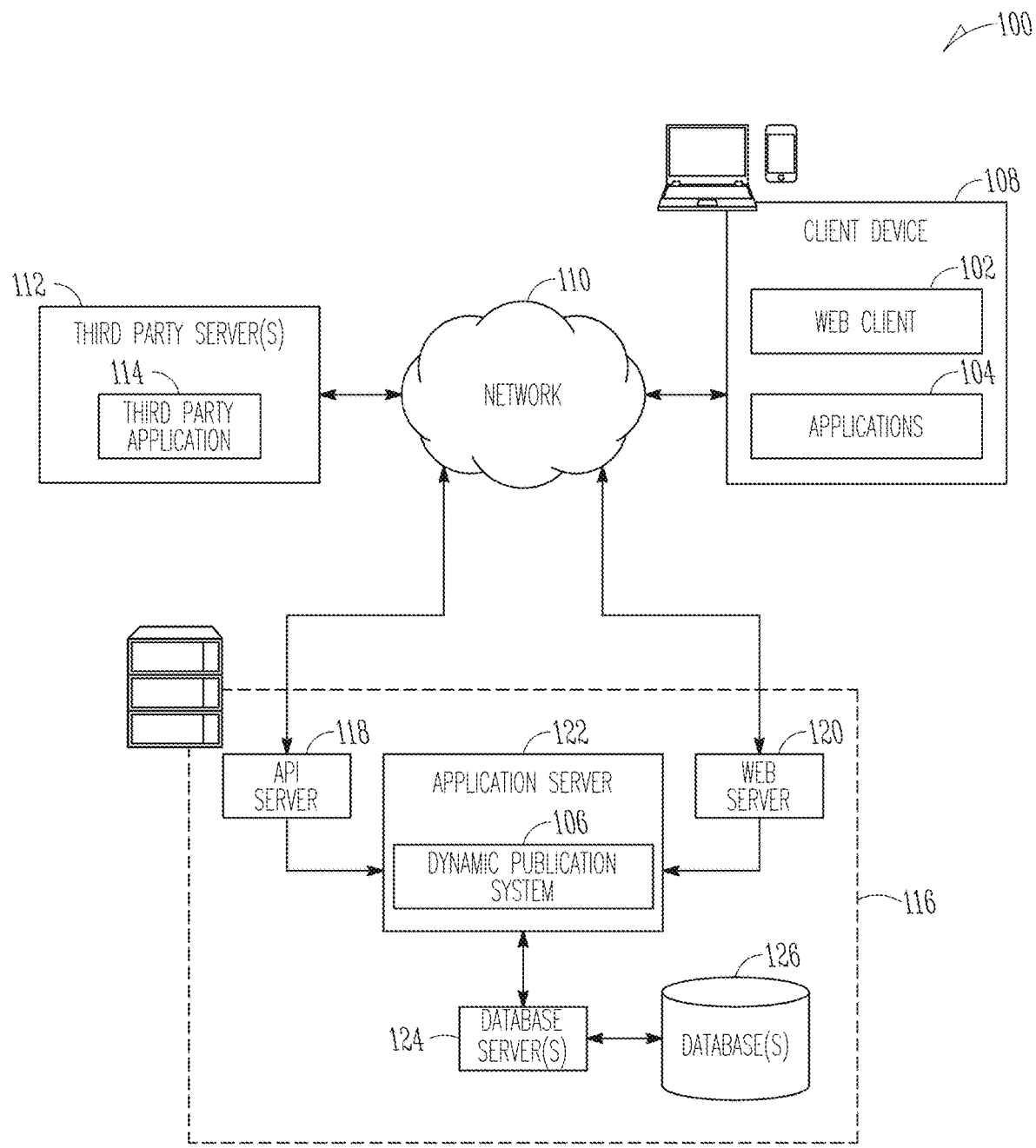
FIG. 1 is a block diagram illustrating a networked environment for a system for publishing dynamic content via email, according to an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail. The present disclosure provides technical solutions to address for example technical problems in systems for publishing dynamic content via email. Systems, methods, and architectures for the optimization of such systems and methods are disclosed herein.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2019, Zeta Interactive Corp., All Rights Reserved.

"CARRIER SIGNAL" in this context in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of several well-known transfer protocols.

"CLIENT DEVICE" in this context refers to any machine that interfaces with a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling of the client device to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"COMPONENT" in this context refers to a device, a physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, later, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across several machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, a device, or other tangible media able to store instructions and data temporarily or permanently, and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium, or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of an application 104, are hosted and execute on the client device 108. The networked system 116 includes an application server 122, which in turn hosts a system 106 for publishing dynamic content via email according to one embodiment. The system 106 (also known as a dynamic publication system 106) provides a number of functions and services to the application 104 that accesses the networked system 116. The application 104 also provides a number of interfaces described herein (see, for example, FIGS. 9-13) for a tool for generating email messages having dynamic content. The interfaces may be presented to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled, and provide programmatic and web interfaces respectively, to the application server 122. The application server 122 hosts the dynamic publication system 106, which includes components or applications. The application server 122 is, in turn, shown to be coupled to a database server 124 that facilitates access to information storage repositories (e.g., a database 126). In an example embodiment, the database 126 includes storage devices that store information accessed and generated by the dynamic publication system 106.

Additionally, a third-party application 114, executing on a third-party server(s) 112, is shown as having programmatic access to the networked system 116 via the programmatic interface provided by the API server 118. For example, the third-party application 114, using information retrieved from the networked system 116, may support one or more features or functions on a website hosted by a third-party.

Turning now specifically to the applications hosted by the client device 108, the web client 102 may access the various systems (e.g., dynamic publication system 106) via the web interface supported by the web server 120. Similarly, the application 104 (e.g., an "app") accesses the various services and functions provided by the dynamic publication system 106 via the programmatic interface provided by the API server 118. The application 104 may be, for example, an "app" executing on the client device 108, such as an IOS™ or ANDROID™ OS application to enable a user to access and input data on the networked system 116 in an offline manner, and to perform batch-mode communications between the application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The dynamic publication system 106 could also be implemented as a standalone software program, which does not necessarily have networking capabilities.

Figure 2:
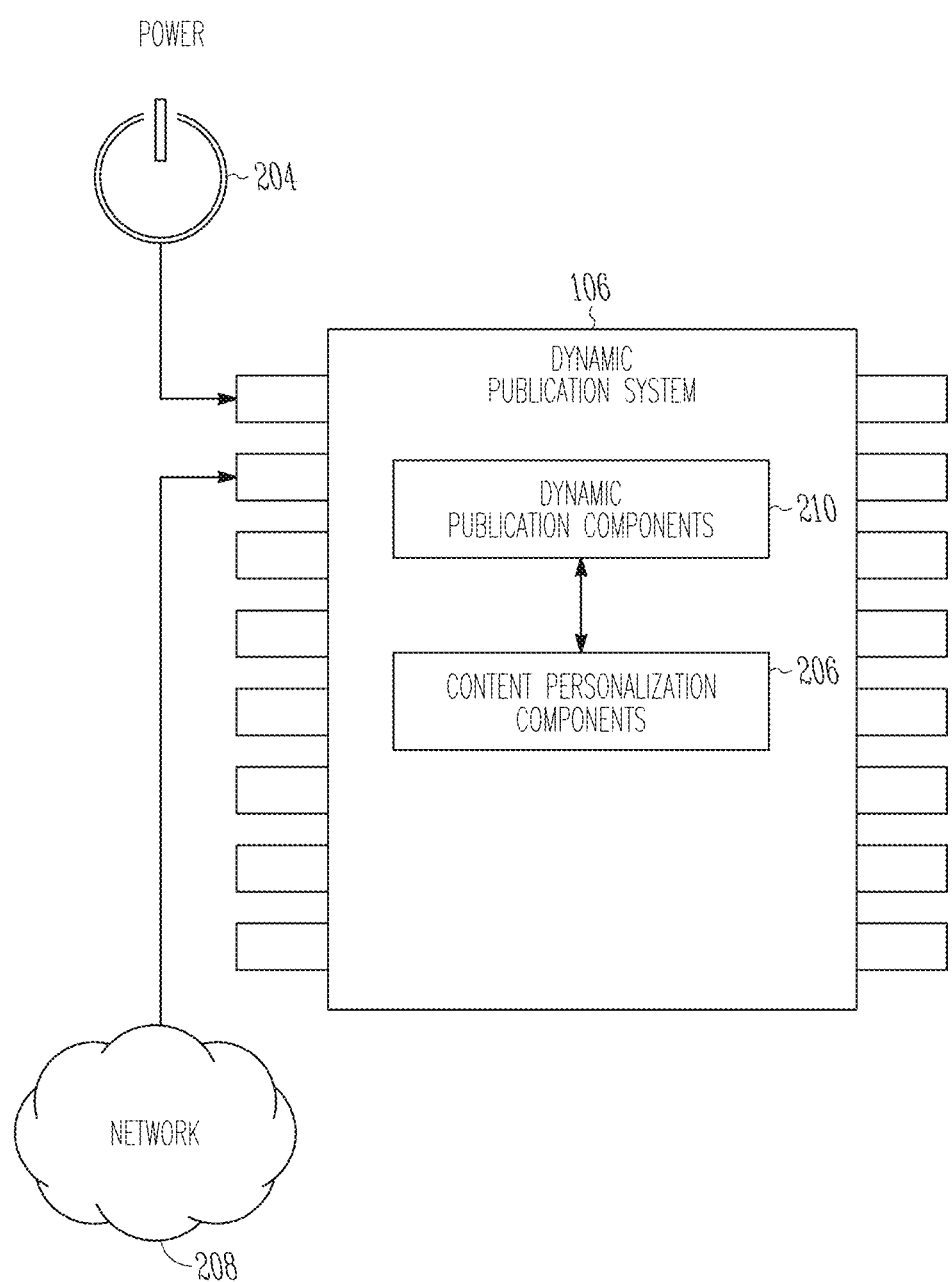
FIG. 2 is a block diagram showing architectural details of the networked environment, according to some example embodiments.

FIG. 2 is a block diagram showing architectural details of a dynamic publication system 106, according to some example embodiments. Specifically, the dynamic publication system 106 is shown to include an interface component 210 by which the dynamic publication system 106 communicates (e.g., over a network 208) with other systems within the SaaS network architecture 100.

The interface component 210 is collectively coupled to one or more dynamic publication components 206 that operate to provide specific aspects of dynamic publication, in accordance with the methods described further below with reference to the accompanying drawings.

Figure 3:
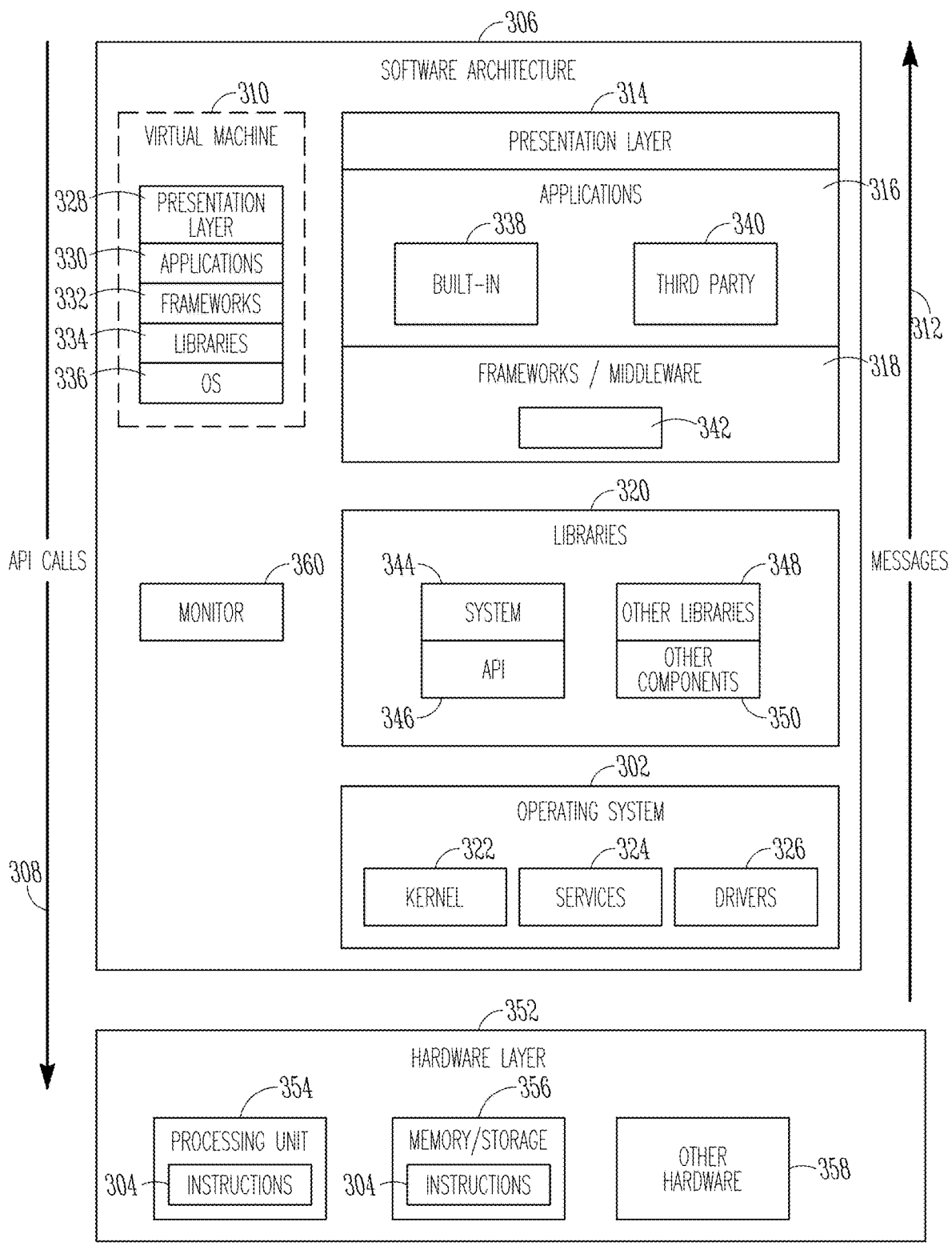
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein. The software architecture 306 may execute on hardware such as a machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processing unit 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke application programming interface (API) API calls 308 through the software stack and receive messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules 350.

The frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system 302 in FIG. 3) and typically, although not always, has a virtual machine monitor 360, which manages the operation of the virtual machine 310 as well as the interface with the host operating system (i.e., operating system 302). A software architecture executes within the virtual machine 310, such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
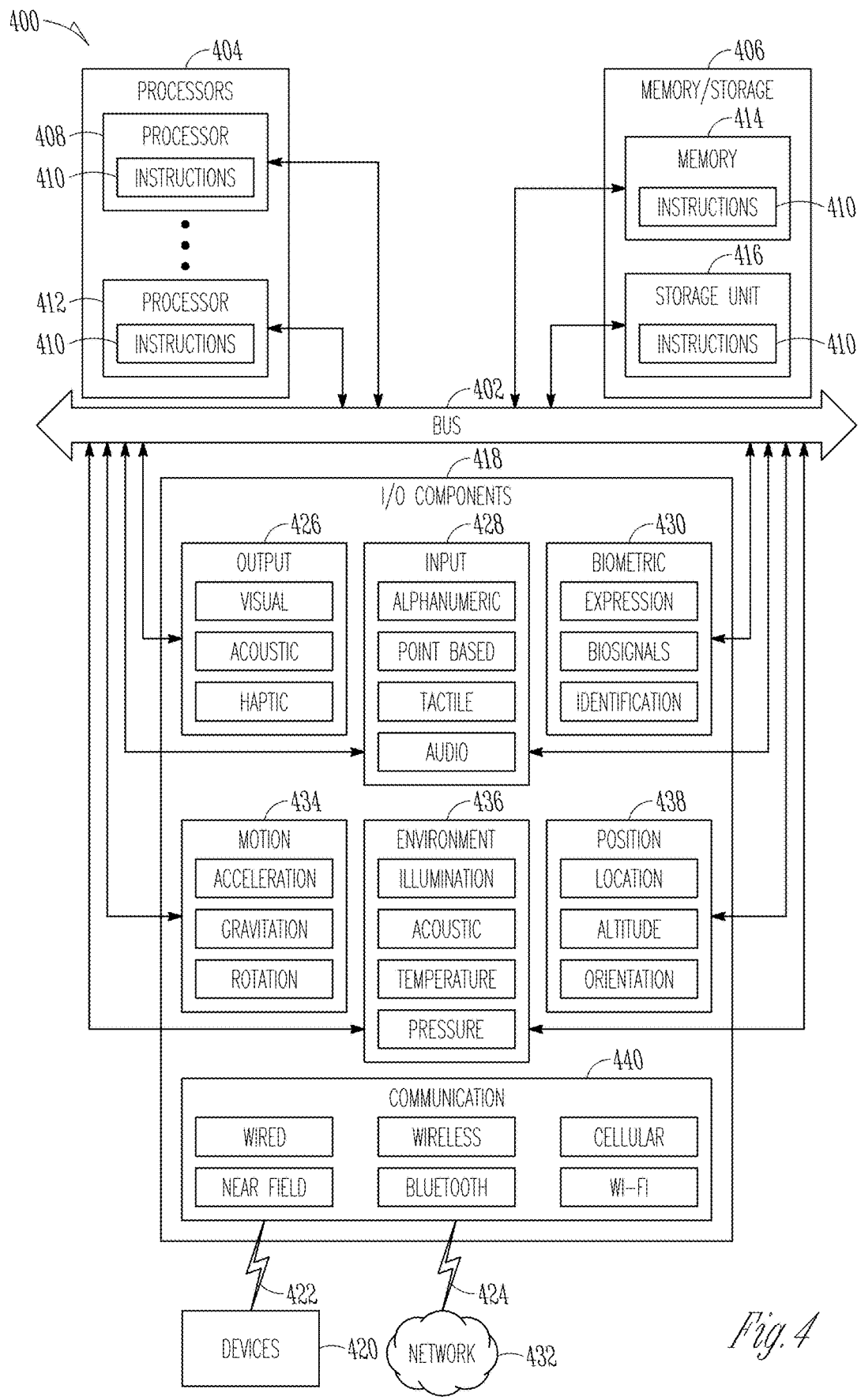
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine into a particular machine programmed to carry out the specific described and illustrated functions in the manner described.

In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422 respectively. For example, the communication components 440 may include a network interface component or another suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geolocation, location via Wi-Fi® signal triangulation, location via detecting an NFC beacon signal that may indicate a particular location, and so forth.

In this example, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operating Systems; databases such as SQL Server, Oracle, NOSQL, and DB2; Business Analytic/Intelligence tools such as SPSS, Cognos, SAS, etc.; development tools such as Java, .NET Framework (VB.NET, ASP.NET, AJAX.NET, etc.); and other e-commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

Figure 5:
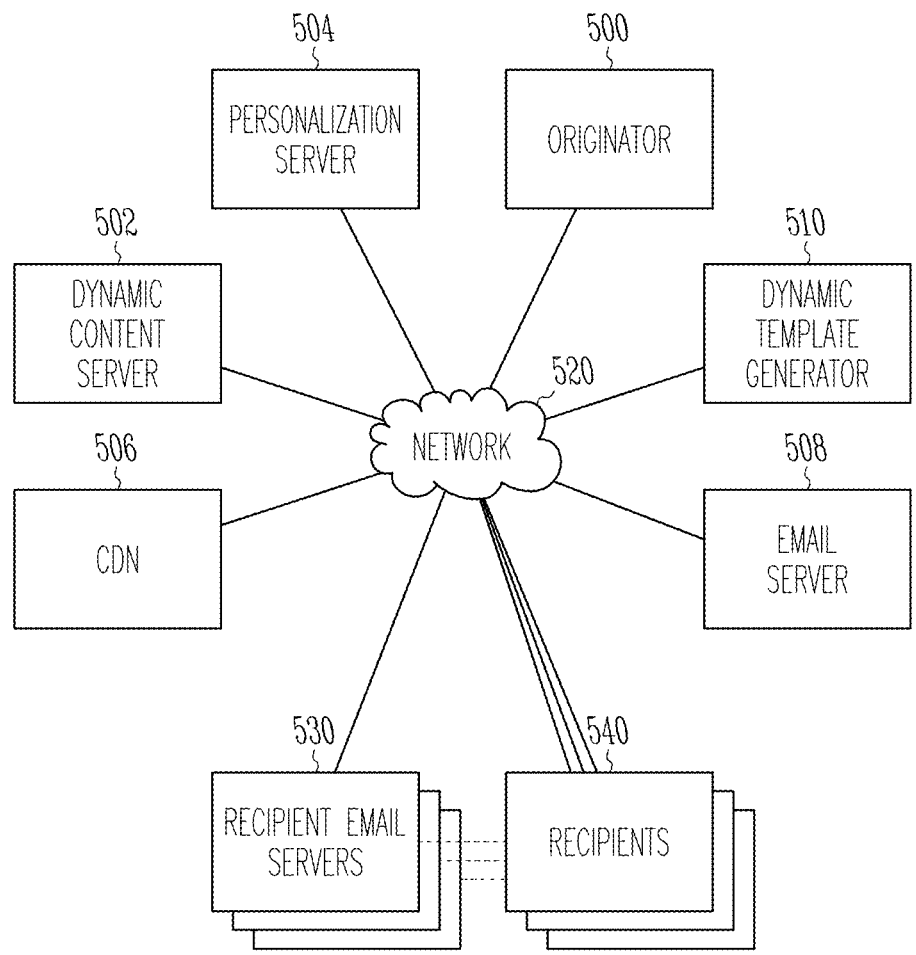
FIG. 5 is a schematic block diagram of a computing environment for disseminating email communications having dynamic content.

FIG. 5 is a schematic block diagram of an embodiment of a system for delivery of email communications having dynamic content, which may, if desired, be determined as late as the time at which an email is viewed by a recipient. Originator 100 accesses dynamic template generator 110 to generate HTML content that can be encapsulated within the body of one or more email messages. Email server 108 can generate one or more email messages containing the message content from template generator 110. Originator 100, template generator 110 and email server 108 each communicate via communications network 120, which may include one or more of the internet, intranets, virtual networks, wireless networks and other means of conveying digital communications.

Other elements within the system of FIG. 5 include personalization server 104, dynamic content server 102, content delivery network 106, one or more recipient email servers 130, and recipient communication devices 140. Recipient devices 140 preferably include individual user devices such as a personal computer, tablet computer, smart phone, smart watch, smart appliances, and other such computing devices, which may be used by individuals to access email.

Figure 6:
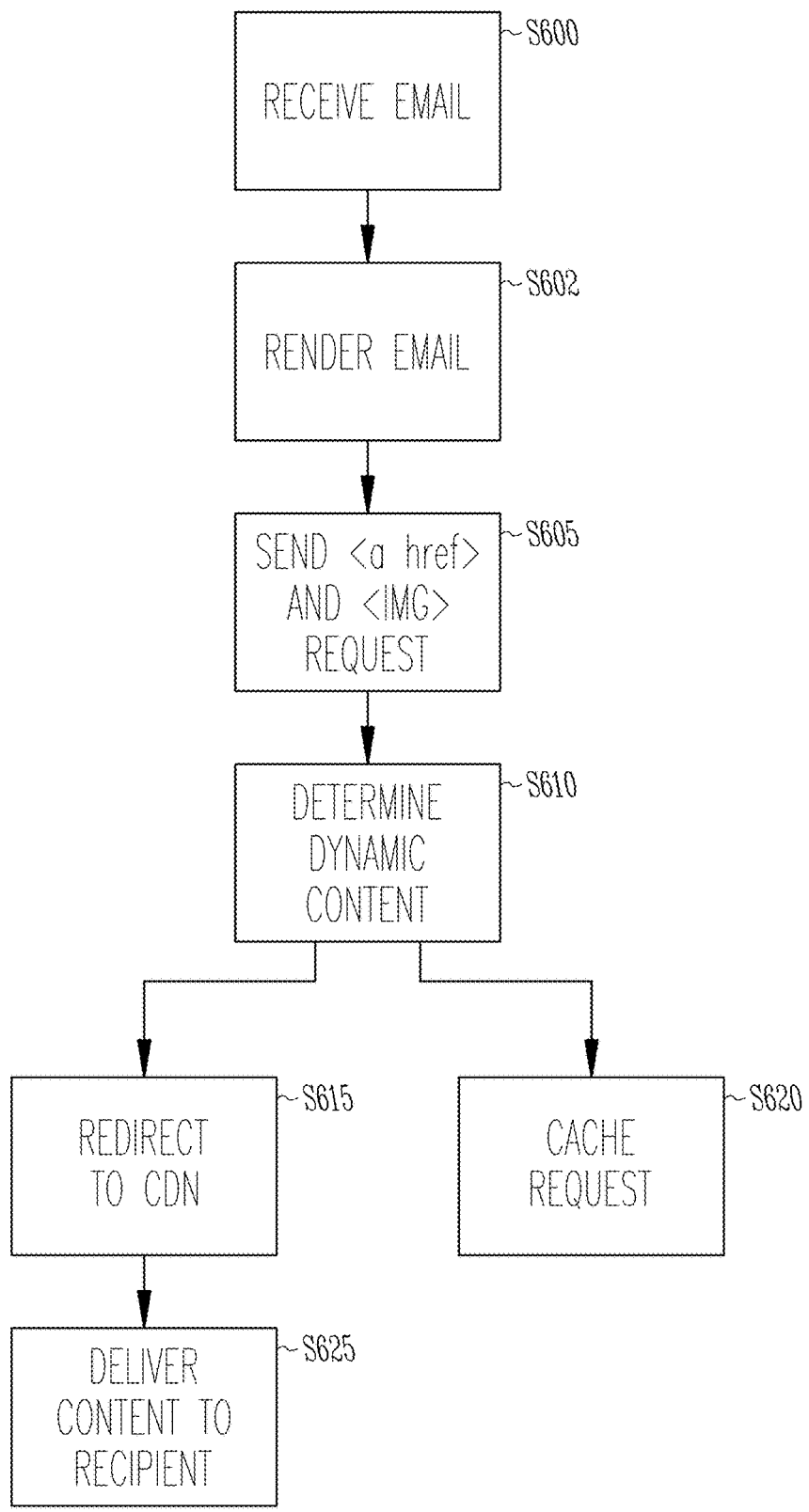
FIG. 6 is a process flow chart for displaying an email having dynamic content.

FIG. 6 is a flow chart of a process that can be implemented by the system of FIG. 5 in order to deliver dynamic content via email. In step S600, an email message is transmitted by email server 108, stored by one or more of recipient email servers 130, and eventually delivered to one or more recipient devices 140.

Figure 7:
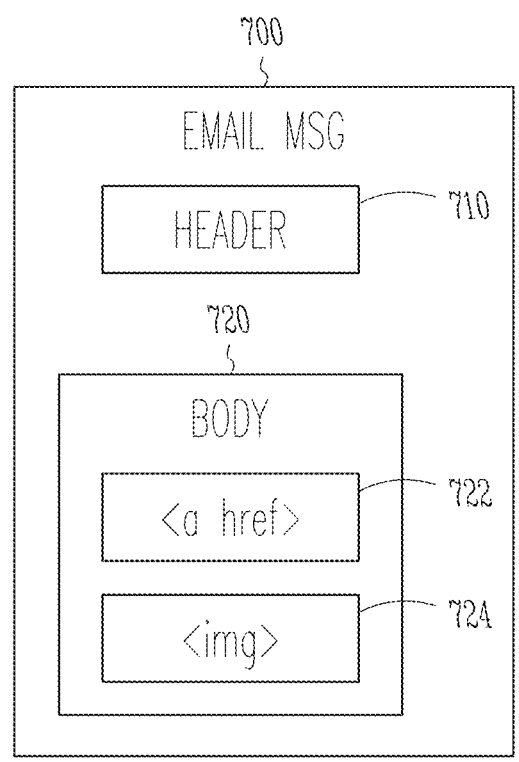
FIG. 7 is a schematic block diagram of an email message with dynamic content.

FIG. 7 is a block diagram illustrating an email message structure that may be utilized in the embodiment of FIGS. 5-6. Email message 300 contains header 310 and body 320, according to standard email formatting protocols. Body 320 includes HTML content having one or more content hyperlinks to dynamic content. Preferably, the hyperlinks are structured as paired <a href> tag 322 and <img> tag 324. Tags 322 and 324 contain URLs that reference dynamic content server 102 but are not directly correlated with a static content item. Rather, the hyperlink request is interpreted by dynamic content server 102 to redirect to one of multiple possible content items.

Preferably, the hyperlink request is redirected to a Dynamic Image content item. A dynamic image is a generated block of content that can contain multiple parts, including image, title text, description text, call-to-action buttons and the like. In some embodiments, a Campaign Builder application can enable users to easily generate dynamic image content and an associated snippet for insertion into an email. The generated snippet is preferably comprised of HTML and CSS content and can be inserted into an email to display dynamic content comprising, e.g., a PNG image dynamically selected from amongst one or more possible PNG images based on, e.g., the email recipient's email address and the date/time that the content was sent.

For example, in one illustrative example, email message body 320 may contain the following HTML code snippet: <a href="http://api.boomtrain.com/dynlink/{CLIENT_AP-P_ID} % EMAILADDRESS %/{MODEL}/{REC_NUM}/{CAMPAIGN_ID}?bt_ts=% TIMESTAMP %" target="_blank">> img src="http://api.boomtrain.com/dynimg/{CLIENT_APP_ID}/% EMAILADDRESS %/{MODEL}/{REC_NUM}/{CAMPAIGN_ID}.png?bt_ts=% TIMESTAMP %"/> </a>

Parsing this exemplary snippet, "http://api.boomtrain.com" is the location of an API implemented by dynamic content server 102 to provide, inter alia, the functionality described above. "dynlink" and "dynimg" specify the content item being generated and are shorthand for "dynamic link" and "dynamic image". The dynlink is wrapped around the dynimg.

"{CLIENT_APP_ID}" is the identification number for the client. The dynamic image snippet will only return content associated with the specified CLIENT_APP_ID. This allows dynamic content server 102, and therefore the dynamic content service provider, to track email opens and clicks for a client. The CLIENT_APP_ID also serves as an API key for the client to access the API implemented by dynamic content server 102.

"% EMAILADDRESS %" is the recipient's email address. This is inserted at the time of sending and uniquely identifies the email recipient to enable personalization or customization of content based on a particular recipient's habits. This can be filled in automatically by an email campaign builder, or manually.

{MODEL} is the type of content that is to be returned by the snippet. Originators can specify what type of content they want to display in certain sections of their email campaign and can use the model type as a filter. For example, {MODEL} types may include "article", "recipes", "blog", "obituaries", or other content type indicators that can be specified by a particular user, as appropriate to their business or use case, in order to manage and categorize the user's content.

{REC_NUM} is an incrementing recommendation number, preferably beginning at 1, of each dynamic image based on how many are displayed before it in an email campaign. Incrementing this number prevents duplication of dynamic images.

{CAMPAIGN_ID} is the identification number for the dynamic image. One originator can have multiple campaign IDs with different content or layout designs associated with each. In the "dynimg" section, this references a specific .png file.

bt_ts=% TIMESTAMP % is the date/time identifier for the dynamic image. Changing this number will generate new content for the recipient and will prevent image caching. This can be filled in dynamically inside an email campaign builder or manually during testing.

In some embodiments, the system of FIG. 5 may also provide a Dynamic Subject Line (DSL) route for Email Service Providers (ESPs) to enable personalized email subjects based on the personalized content served in an email. Use of the DSL, which pulls the title of a personalized resource from the email, can allow each individual to have a unique subject line based on, e.g., their interests.

Using the markers available inside the Dynamic Image, ESPs can implement DSL into the email campaigns of clients who are using the dynamic content service described herein. The DSL must be generated before the recipient opens the email, so the Dynamic Image that is providing the DSL must be rendered before the campaign sends. The other Dynamic Images will still load at time of open. In an exemplary embodiment, the markers available to ESPs are as follows: % EMAILADDRESS %, % TIMESTAMP %, {CLIENT_APP_ID}, {MODEL}, and {REC_NUM}.

In step S602, email message 300 is rendered on recipient device 140. Rendering of email 300 may be accomplished via different mechanisms. For example, in some embodiments, a locally-installed email client implemented on recipient device 140 may render message 300 by interpreting message content and displaying it on a local device display. In some embodiments, such as a webmail embodiment, recipient device 140 may interact with a remote webmail server to render message 300 within a web browser application. In either case, HTML content within email message 300 is interpreted. In step S605, interpretation of href tag 322 and img tag 324 causes recipient device 140 to transmit a request to dynamic content server 102 via network 120.

In step S610, dynamic content server 102 interprets the request received during step S205 to determine content that will be served to recipient 140 in response thereto. The message ID contained within the request may be utilized by dynamic content server 102 to identify a particular email content item with which the request is associated. The message ID therefore is used to determine a selection of content items from which the dynamic determination may be made (e.g. different winter clothing items available for display to a user during a clothing retailer's December advertising campaign). The UUID contained within the request may be utilized by dynamic content server 102 to identify, e.g., content believed to be of interest to a particular user associated with the UUID, or content that originator 100 desires to deliver to the particular user associated with the UUID. Identification of personalized content for delivery to a particular user may be achieved in any of a number of ways. Identification of personalized content for delivery to a particular user may also be achieved using techniques such as those described in U.S. patent application Ser. No. 15/367,579, filed on Dec. 2, 2016, claiming priority from U.S. Provisional Patent Application 62/262,273, filed on Dec. 2, 2015, the contents of both of which are herein incorporated by reference. In such an embodiment, information from the request of step S605 (such as a UUID) is relayed from dynamic content server 502 to personalization server 504, and personalization server 504 return a content item ID (which may include or consist of a URL) to which the original request is redirected (as described below).

In some embodiments, a new content determination for a particular user and dynamic content item (i.e. a particular href and img tag set) is made each time the request is received; in such cases, a user may view different content each time an email is opened. In this way, an email can deliver content specifically tailored to meet a user's current interests and/or activities, potentially in near real-time.

In other embodiments, it may be desirable for dynamic content determinations to have some degree of persistence. Dynamic content determinations may persist for a period of time; e.g. dynamic content server 102 may fix a mapping of a particular href and img tag set to a particular content item, for a period of one week, such that an email is rendered with the same content for a period of one week after the first rendering; and a new content determination is made after the persistence period expires. Persistence periods can be, inter alia, fixed for all users, determined dynamically for each user, or determined dynamically based at least in part on the content item dynamically associated with the request.

In step S615, the request from step S605 is redirected to a content item identified in step S610, the content item preferably made available via content delivery network (CDN) 506. The dynamically identified content item is then delivered from CDN 506 to recipients 540 via network 520.

Meanwhile, in step 620, dynamic content server 502 caches the association between the request in step S605 and the content with which the request is associated in step S610.

The request/content association stored in step S620 may be utilized to enable content persistence, as described above, or for other purposes.

In some embodiments, it may be desirable not only to select a content item subject matter dynamically, but also its display size. Embodiments using <a href> <img> tag sets will return image content. It may be desirable to store (such as within CDN 506) multiple versions of each asset that may be returned, having different image sizes (i.e. resolutions) for different viewing devices (such as mobile phone, tablet, or PC). Dynamic content server 502 can then use browser type and size information inherent in HTML requests to redirect the incoming request in step S615 to a content item having image size appropriate for the user's current display device. In other embodiments, the multiple versions or each asset may differ not only in image size, but also aspect ratio and content, in order to optimize the displayed content item for the viewing device.

In some circumstances, dynamic content determinations can also incorporate other information inherent in the HTML request of step S605. For example, in step S610, dynamic content server 502 may detect the originating IP address of recipient 540 and perform a location lookup. The location associated with the user's IP address may then be utilized in making the dynamic content determination in step S610. In this way, a user who normally lives in one location but has, for example, a vacation home in another location, may receive content tailored to their current location. Such location-based content determinations may include things such as locally relevant news items, or advertisements for goods and services relevant to the user's current location at the time the email is viewed.

Using techniques described herein, emails can be transmitted to users having content templates and styling set at the time of transmission, but for which some or all email content is not determined until the user actually views the email. Methods and systems described herein can be utilized to transmit dynamic content using any standard outbound email service, avoiding a need for a business to switch to a different email service to take advantage of the described functionality. Also, recipients can view dynamic content using any standard email client and service, without requiring special applications, plug-ins or extensions.

The methods and apparatus described herein can be utilized in different applications. For example, real-time A/B testing campaigns can be executed via email. Traditionally, A/B testing in email campaigns involve pre-assigning batches of users to each of multiple different email templates. Different emails are sent to different groups of users, and response rates are evaluated after sending. In such circumstances, the results of such testing cannot be utilized to impact user messaging until a subsequent batch of emails is sent. Therefore, email content that performs badly will continue to be viewed by all users to whom that content was originally sent, before the poor performance was identified. By contrast, systems described herein may be used for A/B testing in a manner that enables dynamic, real-time adjustment of content mix. A single email template may be sent to an entire batch of users (optionally including different UUID and/or message IDs embedded therein). The allocation of different content to different users may be made in real-time, as the messages are viewed (e.g. during step S610 of FIG. 6). Therefore, if a particular content item is deemed to be performing well, dynamic content server 502 can operate to automatically allocate a greater proportion of content requests to the highest-performing content. Similarly, if a particular content item is deemed to be performing poorly, dynamic content server 502 can operate to automatically allocate a smaller proportion of content requests to the poorly-performing content or eliminate that content from display altogether. Such adjustments can be made in real-time, even after the original transmission of the emails.

Figure 8:
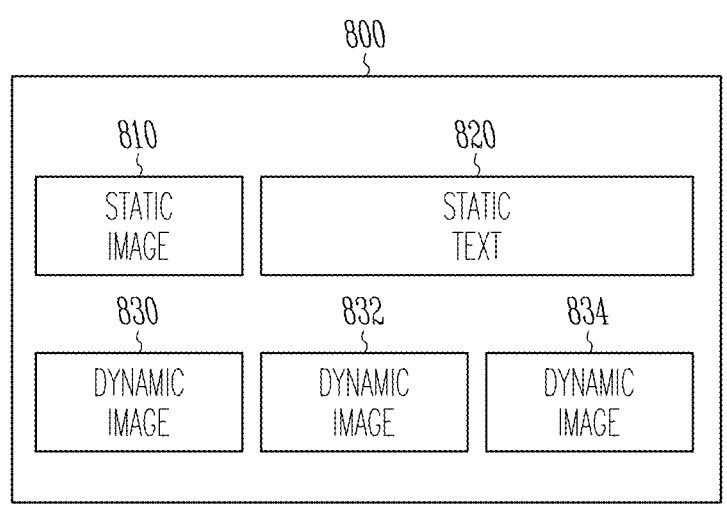
FIG. 8 shows an email message template having static and dynamic content.

In some circumstances, it may be desirable to integrate business rules into the dynamic content determination of step S610. For example, FIG. 8 illustrates an email advertisement having a template with static image 810 and static text 820, such as may be useful to, e.g., advertise a featured item that the advertiser desires to display to all recipients of the email. The same email contains multiple other content items 830, 832 and 834, which are determined dynamically, such as a selection of three items that are believed to be most desirable for the specific recipient of email 800 (for example, as determined by personalization server 104). Each of dynamic content items 830, 832 and 834 includes a <a href> <img> tag set having unique IDs embedded therein. Absent additional constraints, for some users, personalization server may select content for one of dynamic content items 830, 832 and 834, which is the same as static content item 810. To the extent it may be undesirable to display duplicate content, additional business rules may be applied. In the advertising example, an exclude rule may be desirable, to exclude the content item associated with static image from selection for one of dynamic content items 830, 832 and 834.

Figure 9:
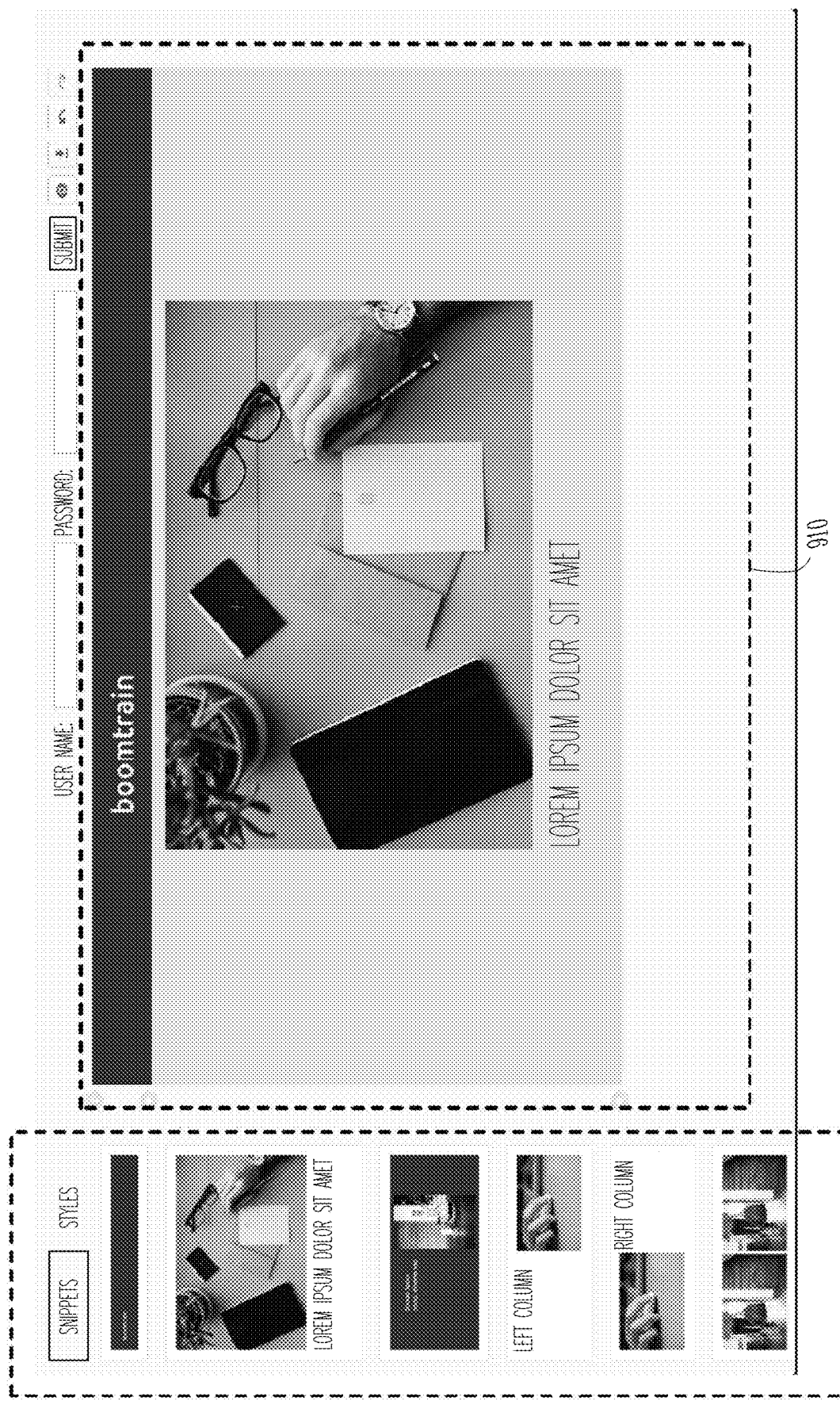
FIGS. 9-13 show example user interfaces of a tool for generating email messages having dynamic content.

In accordance with another aspect, as briefly referenced hereinabove, dynamic template generator 110 provides a service for composing emails containing dynamically-determined content, such as the email template of FIG. 8. FIG. 9 illustrates a portion of an exemplary user interface that may be rendered by dynamic template generator 110 and rendered on a web browser utilized by originator 100. Region 500 enables selection of one of multiple predefined content layouts; alternatively, a user can upload their own HTML for association with a snippet. Region 510 displays a full-size representation of the selected predefined content layout.

Figure 10:
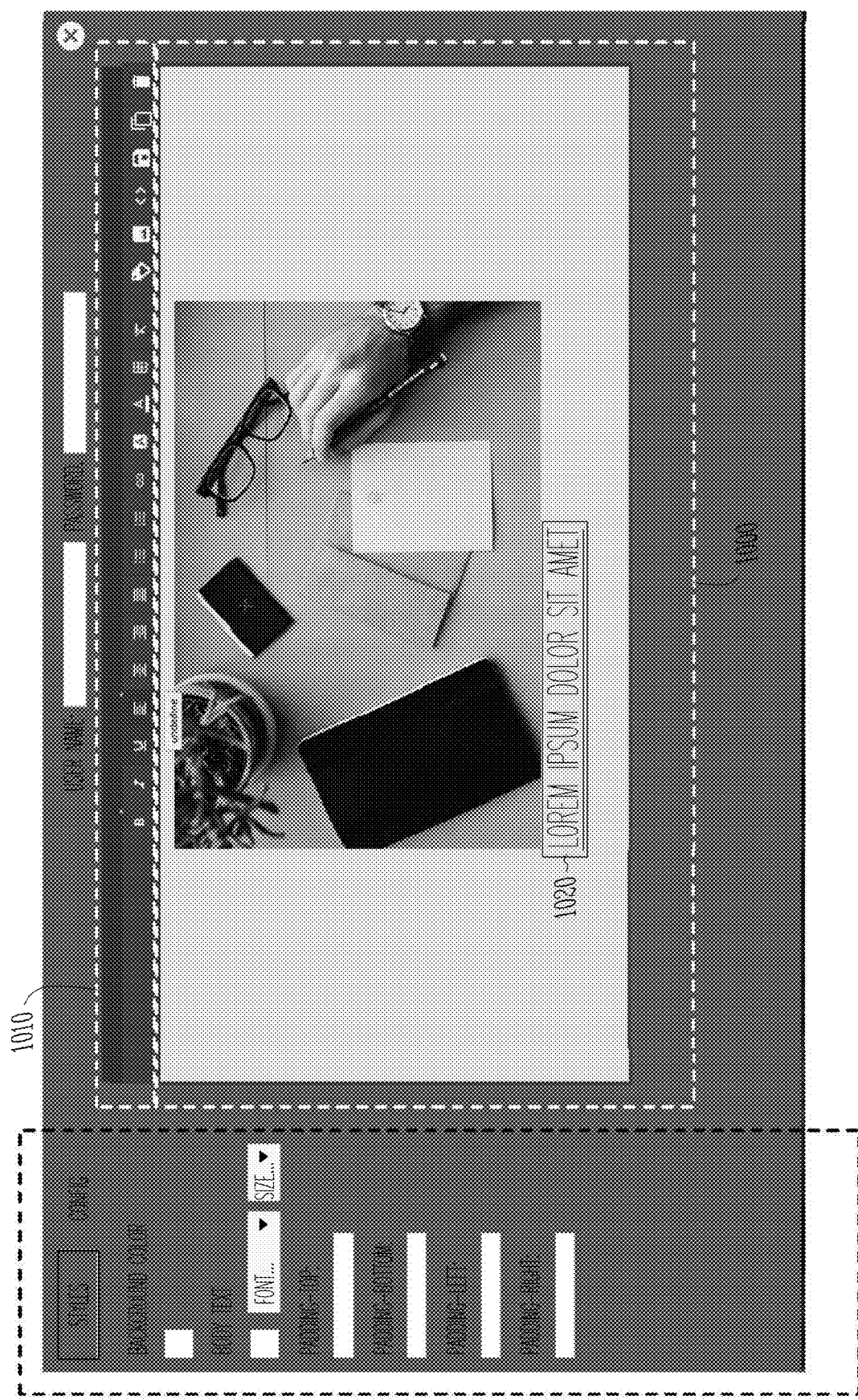
Figure 11:
Figure 12:

After an initial composition layout is selected in FIG. 9, the content can be edited and customized via the user interface of FIG. 10, providing a WYSIWYG inline content editor. Content region 900 displays the content currently being edited. Tools bar region 910 provides editing and/or formatting tools for the currently-selected content item 920. Styles side bar 930 provides further content editing capabilities; in this case, side bar 930 enables customization and configuration of overall parameters and characteristics of the email message under composition.

Preferably, selected attributes may be turned into personalized attributes, so that custom HTML generated by the content editor can be personalized or customized for each and every recipient when they open the content. For example, in FIG. 11, tools 100 enable personalization of selected content item 1020, so that the selected "Resource Title" item is determined dynamically for each user.

Figure 13:
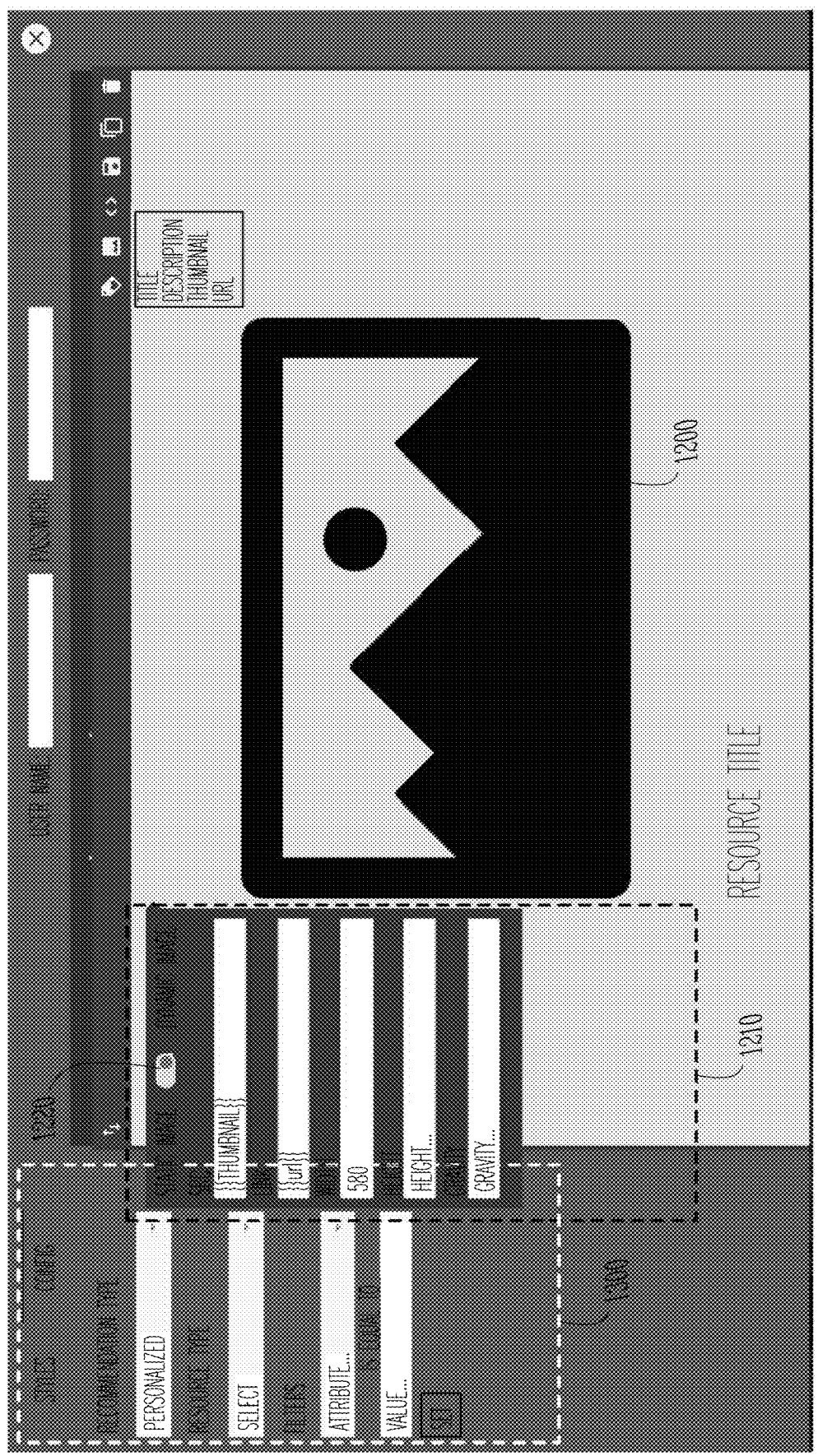

Images can also be configured as either static or dynamic. For example, in FIG. 12, selection of image template content region 1200 triggers pop-up menu. Pop-up menu 1210 allows the user to toggle image content region 1200 between static and dynamic image content using image type toggle 1220. Static image content parameters (illustrated in FIG. 12) enable a user to, inter alia, upload a static image for display in the configured layout. If image type toggle 1220 is set to "Dynamic Image", image content region 1200 displays a content placeholder image, while popup menu 1210 displays parameters associated with a dynamic image snippet. In FIG. 13, the side bar 1300 displays filters and other configuration options to be used by dynamic content server 502 to determine a content item to be returned when the resulting email is viewed by a user.

In some examples, a non-transitory machine-readable medium includes instructions that, when read by a machine, cause the machine to perform operations comprising at least the non-limiting example operations summarized above, and described more generally herein with reference to the accompanying figures.

Although the subject matter has been described with reference to some specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A computerized method, at a dynamic publication system, for publishing dynamic content via email, the computerized method including operations comprising at least:
   receiving an email template at an email server;
   transmitting an email message by the email server for delivery to a batch of recipient user devices, the email message including a header and a body in accordance with the email template, wherein the body includes one or more content hyperlinks to the dynamic content;
   receiving, via a network, requests for the dynamic content at a dynamic content server in response to each respective rendering of the email message on a recipient user device of the recipient user devices;
   allocating, in real-time by the dynamic content server in response to the received requests, different pieces of the dynamic content to different recipient user devices of the recipient user devices as the email message is rendered on the different recipient user devices, the allocating the different pieces dynamic content comprising, for each of the received requests, dynamic content determination to determine which of the different pieces of the dynamic content to serve to a respective recipient user device of the recipient user devices by:

detecting, among from the received request for the dynamic content, an originating IP address of a first the respective recipient user device of the recipient user devices rendering the email message and requesting the dynamic content;

performing a location lookup based on the detected originating IP address to determine a current location of the respective first recipient user device;

making a first dynamic content determination based on the current location, the first dynamic content determination identifying at least one of the different pieces of the dynamic content relevant to the current location to render in the email message on the respective recipient user device;

fixing a mapping, by the dynamic content server, of the one or more content hyperlinks to the identified at least one of the different pieces of the dynamic content for a duration of a persistence period, wherein determining a degree of persistence for the dynamic content determination, the degree of persistence including a persistence period that specifies a period of time for when the identified at least one of the different pieces of the dynamic content determination expires after a first rendering of the identified at least one of the different pieces of the dynamic content on one of the recipient user devices;

fixing a mapping of the one or more content hyperlinks to the identified different pieces of dynamic content for a duration of the persistence period; and transmitting the identified at least one of the different pieces of the dynamic content to the respective recipient user device and to one or more other recipient user devices of the batch of recipient user devices at the current location requesting the dynamic content until the persistence period expires.

2. The method of claim 1, wherein the mapping of the one or more content hyperlinks to the identified at least one of the different pieces of the dynamic content causes the email message to be rendered with the identified at least one of the different pieces of the dynamic content on the respective first recipient user device for the duration of the persistence period.

3. The method of claim 1, wherein the persistence period is determined dynamically upon making the first dynamic content determination based on the identified at least one of the different pieces of the dynamic content.

4. The method of claim 1 further comprising determining the persistence period of the first dynamic content determination is expired;

detecting, among the requests for the dynamic content, a new originating IP address of the first respective recipient user device;

performing a second location lookup based on the detected new originating IP address to determine an updated current location of the first respective recipient user device;

making a second content determination based on the updated current location; and transmitting at least one of the different pieces of the dynamic content identified by the second content determination to the first respective recipient user device.

5. The method of claim 1, further comprising determining a particular content item with which a particular request for the dynamic content is associated based on a message ID contained within the particular request for the dynamic content.

6. The method of claim 5, further comprising relaying information from the particular received request for the dynamic content to a personalization server;

receiving, from the personalization server, a content item ID;

making a new content determination based on the content item ID; and transmitting different content to a recipient user device in response to an email message on the recipient user device being opened.

7. The method of claim 5, further comprising redirecting the particular request for the dynamic content to a content item identified by a content item ID; and transmitting the content item to a recipient user device via a content delivery network.

8. The method of claim 7, further comprising caching the particular content item with which the particular request for the dynamic content is associated; and utilizing the cached particular content item to enable a determination of the persistence period.

9. The method of claim 1 further comprising tracking a number of times the email message including the different pieces of the dynamic content is opened on the recipient user devices;

determining performance levels of content items in the different pieces of the dynamic content;

based on the determined performance levels, allocating a greater proportion of subsequent requests for the dynamic content to a highest-performing dynamic content of the different pieces of the dynamic content; and based on the determined performance levels, eliminating a further piece of dynamic content of the different pieces of the dynamic content that is performing poorly.

10. The method of claim 1, further comprising selecting, from the identified at least one of the different pieces of the dynamic content, personalized content for the users of the recipient user devices based on at least one of an identity of the users, a mood of the users, a behavior of the users, a habit of the users, and a topic of interest of the users.

11. A dynamic publication system comprising:

at least one processor for executing machine-readable instructions; and a memory storing instructions executable by the at least one processor configured to:

receive an email template at an email server;

transmit an email message by the email server for delivery to a batch of recipient user devices, the email message including a header and a body in accordance with the email template, wherein the body includes one or more content hyperlinks to the dynamic content;

receive, via a network, requests for the dynamic content at a dynamic content server in response to each respective rendering of the email message on a recipient user device of the recipient user devices;

allocate, in real-time by the dynamic content server in response to the received requests, different pieces of the dynamic content to different recipient user devices of the recipient user devices as the email message is rendered on the different recipient user devices and, for each of the received requests, allocating which of the different pieces of the dynamic content to serve to a respective recipient user device of the recipient user devices by:

detecting, among from the received request for the dynamic content, an originating IP address of a first the respective recipient user device of the recipient user devices rendering the email message and requesting the dynamic content;

performing a location lookup based on the detected originating IP address to determine a current location of the respective first recipient user device;

making a first dynamic content determination based on the current location, the first dynamic content determination identifying at least one of the different pieces of the dynamic content relevant to the current location to render in the email message on the respective recipient user device;

fixing a mapping, by the dynamic content server, of the one or more content hyperlinks to the identified at least one of the different pieces of the dynamic content for a duration of a persistence period, wherein determining a degree of persistence for the dynamic content determination, the degree of persistence including a persistence period that specifies a period of time for when the identified at least one of the different pieces of the dynamic content determination expires after a first rendering of the identified at least one of the different pieces of the dynamic content on one of the recipient user devices;

fixing a mapping of the one or more content hyperlinks to the identified different pieces of dynamic content for a duration of the persistence period; and transmitting the identified at least one of the different pieces of the dynamic content to the respective recipient user device and to one or more other recipient user devices of the batch of recipient user devices at the current location requesting the dynamic content until the persistence period expires.

12. The system of claim 11, wherein the mapping of the one or more content hyperlinks to the identified at least one of the different pieces of the dynamic content causes the email message to be rendered with the identified at least one of the different pieces of the dynamic content on the respective first recipient user device for the duration of the persistence period.

13. The system of claim 11, wherein the persistence period is determined dynamically upon making the first dynamic content determination based on the identified at least one of the different pieces of the dynamic content.

14. The system of claim 11, wherein the at least one processor is further configured to determine the persistence period of the first dynamic content determination is expired;

detect, among the requests for the dynamic content, a new originating IP address of the first respective recipient user device;

perform a second location lookup based on the detected new originating IP address to determine an updated current location of the first respective recipient user device;

make a second content determination based on the updated current location; and transmit at least one of the different pieces of the dynamic content identified by the second content determination to the first respective recipient user device.

15. The system of claim 11, wherein the at least one processor is further configured to determine a particular content item with which a particular request for the dynamic content is associated based on a message ID contained within the particular request for the dynamic content.

16. The system of claim 15, wherein the at least one processor is further configured to relay information from the particular received request for the dynamic content to a personalization server;

receive, from the personalization server, a content item ID;

make a new content determination based on the content item ID; and transmit different content to a recipient user device in response to an email message on the recipient user device being opened.

17. The system of claim 15, wherein the at least one processor is further configured to redirect the particular request for the dynamic content to a content item identified by a content item ID; and transmit the content item to a recipient user device via a content delivery network.

18. The system of claim 17, wherein the at least one processor is further configured to cache the particular content item with which the particular request for the dynamic content is associated; and use the cached particular content item to enable a determination of the persistence period.

19. The system of claim 11, wherein the at least one processor is further configured to track a number of times the email message including the different pieces of the dynamic content is opened on the recipient user devices;

determine performance levels of content items in the different pieces of the dynamic content;

based on the determined performance levels, allocate a greater proportion of subsequent requests for the dynamic content to a highest-performing dynamic content of the different pieces of the dynamic content; and based on the determined performance levels, eliminate a further piece of dynamic content of the different pieces of the dynamic content that is performing poorly.

20. The system of claim 11, wherein the at least one processor is further configured to select, from the identified at least one of the different pieces of the dynamic content, personalized content for the users of the recipient user devices based on at least one of an identity of the users, a mood of the users, a behavior of the users, a habit of the users, and a topic of interest of the users.

* * * * *